United States Patent [19]

Clair

[11] Patent Number: 6,147,688

[45] Date of Patent: Nov. 14, 2000

[54] METHOD AND APPARATUS FOR DEFINING AND SELECTIVELY REPEATING UNIT IMAGE CELLS

[75] Inventor: Robert Clair, Belmont, Mass.

[73] Assignee: Athena Design Systems, Inc., Cambridge, Mass.

[21] Appl. No.: 08/084,345

[22] Filed: Jun. 28, 1993

[51] Int. Cl.[7] .................................................. G06F 15/00
[52] U.S. Cl. ............................................................ 345/423
[58] Field of Search .................................... 345/430, 433, 345/423, 419, 117, 118; 395/130, 133

[56] References Cited

U.S. PATENT DOCUMENTS

| | | | |
|---|---|---|---|
| 4,615,013 | 9/1986 | Yan et al. | 364/521 |
| 5,003,496 | 3/1991 | Hunt, Jr. et al. | 364/521 |
| 5,303,334 | 4/1994 | Snyder et al. | 395/109 |

FOREIGN PATENT DOCUMENTS 0535987  4/1993  European Pat. Off. .
9210904  6/1992  WIPO .

OTHER PUBLICATIONS

Schachter et al., 10 *Comp. Graphics and Image Proc.* 95 (1979).

32 IBM *Tech. Discl. Bull.* 76 (1990).

*Primary Examiner*—Phu K. Nguyen
*Attorney, Agent, or Firm*—Cesari and McKenna, LLP

[57] ABSTRACT

A method and system for generating designs by repetition of a user-defined image component which is arranged throughout an image pixelmap according to any desired pattern. Vector descriptions are used to specify pixelmap locations where the unit cell is to be copied. A user can define placement vectors that copy the unit cells apart from one another, adjacent one another or in an overlapping pattern. In the latter case, a formalism is provided for "masking out" a portion of the unit cell to avoid deletion of desired image information.

6 Claims, 3 Drawing Sheets

METHOD AND APPARATUS FOR DEFINING AND SELECTIVELY REPEATING UNIT IMAGE CELLS

BACKGROUND OF THE INVENTION

A. Field of the Invention

The present invention relates to digital imaging, and in particular to repetitive duplication of an image area digitally stored in a display list.

B. Description of the Related Art

Computer storage and processing of images requires decomposition of image information into digital form. In high-level applications, such as pre-press or computer-aided design (CAD) systems, images are often represented and stored as specifications in a common representational format, e.g., page-description language instructions. Such a format reduces storage requirements and allows resolution-independent specification of image components.

In order to be output on a specific device, however, or in the case of complex images that cannot be represented by a series of instructions, image data must take the form of a raster pattern of discrete picture elements, or "pixels," with each pixel corresponding to an identified image point. The entire set of pixels representing an image is termed a "pixelmap" of the image. While simple monochrome image pixels can consist of single computer-memory bits, each of which indicates whether the corresponding image point is light or dark, color image pixels require additional specification information (e.g., values for hue, color value, and saturation). As used herein, the term "pixelmap" refers to raster patterns of pixels and/or bits.

In many areas of design, particularly those involving decorative applications, patterns may be based on repeating units which collectively form the complete image. Indeed, textile designers frequently devote the bulk of their creative efforts toward the origination of new unit cells, which are used as motifs in the construction of a variety of final image arrangements.

Unfortunately, current CAD systems do not provide the ability to selectively repeat defined image patterns throughout a pixelmap. Instead, users copy image portions manually to create a composite picture. This process is time-consuming and inconvenient. Depending on the manner in which copying is carried out, unintentional overwriting of image components can also occur.

DESCRIPTION OF THE INVENTION

A. SUMMARY OF THE INENTION

The present invention provides a method and system for generating images from a user-defined "unit cell," or basic image component, arranged throughout an image pixelmap according to any desired pattern. The invention makes use of vector descriptions to specify pixelmap locations where the unit cell is to be copied. The user can define placement vectors that specify where to copy the unit cells, e.g., adjacent one another or even in an overlapping pattern. In the latter case, the invention provides a formalism for "masking out" a portion of the unit cell's background to avoid deletion of desired image information.

B. BRIEF DESCRIPTION OF THE DRAWINGS

The foregoing discussion will be understood more readily from the following detailed description of the invention, when taken in conjunction with the accompanying drawings, in which.

C. DETAILED DESCRIPTION OF THE PREFERRED EMBODIMENTS

Figure 1:
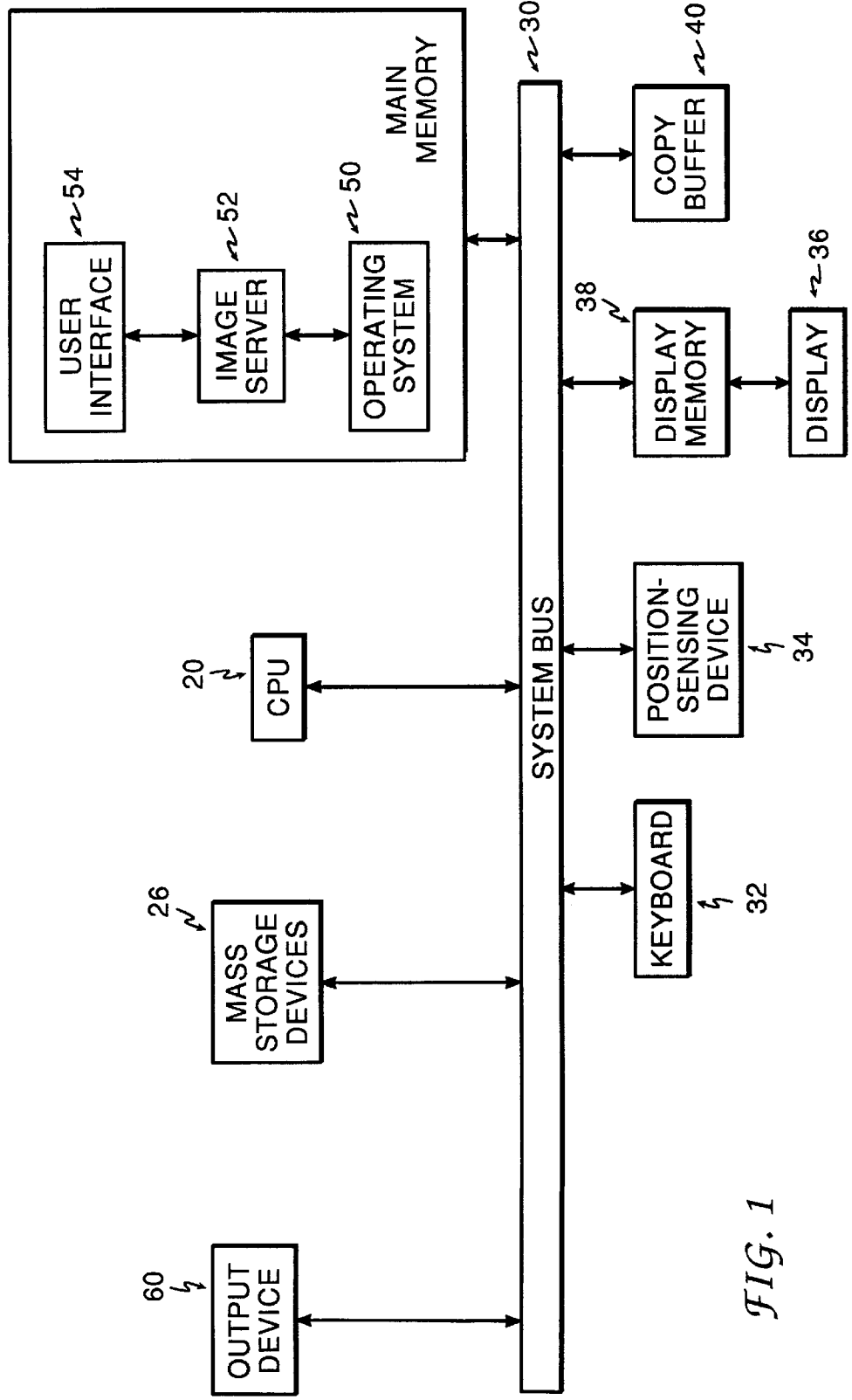
FIG. 1 is a block diagram of an electronic imaging and composition system that incorporates the present invention.

Refer first to FIG. 1, which illustrates, in block-diagram form, a system incorporating the invention. As indicated therein, the system includes a central processing unit (CPU) 20, which performs operations on and interacts with a main system memory 22 and components thereof. The system further includes at least one mass storage device 26, which contains permanent files of image information created by the user. All components of the system communicate over a system bus 30.

The user interacts with the system using a keyboard 32 and, preferably, a position-sensing device (e.g., a mouse) 34. The output of either device can be used to designate information, select particular areas of a screen display 36 corresponding to functions to be performed by the system, or generate image data. The contents of display 36 are specified by a display memory 38 and its contents. As described further below, the invention makes use of a second, auxiliary display memory (i.e., which may be, for example, a memory partition specifying off-screen pixel locations) to facilitate copying operations; this component, indicated by reference numeral 40, is referred to as the COPY BUFFER.

The main memory 22 contains a group of modules that control the operation of CPU 20 and its interaction with the rest of the system. An operating system 50 directs the execution of low-level, basic system functions such as memory allocation, file management and operation of mass storage devices 26. An image server 52 operates at a higher system level, and directs display of image files bounded by known memory-address locations. Software capable of executing the functions of image server 52 is well-characterized in the art. For example, image server 52 can utilize file and pointer information to access vector descriptions contained in mass storage devices 26, then "rasterize" these descriptions into a pixelmap that is transferred to display memory 38 over the system bus 30.

Display memory 38 defines a "raster," i.e., a regular two-dimensional pattern of discrete pixel positions that collectively covers the image area of display memory 38. The contents of each location in display memory 38 directly governs the appearance of a corresponding image pixel on display 36. When the user determines the image shown on display 36 to be satisfactory, that image can be sent to an output device 60 (such as a full-color laser printer). Typically, image server 52 provides image data to output devices in vector or other compatible format, which the device rasterizes at the appropriate resolution for output. Alternative arrangements are also possible, however; for example, image server 52 can fully rasterize the image for transfer to an output device, or the device itself configured to interpret image data in the format utilized by image server 52.

The user interface 54, which operates at the highest level of interactivity, generates words or graphical images on display 36 to prompt action by the user, and accepts user commands entered from keyboard 32 and/or position-sensing device 34 to create or retrieve images.

It must be understood that although the modules of main memory 22 have been described separately, this is for clarity of presentation only; so long as the system performs all necessary functions, it is immaterial how they are distributed within the system and the programming architecture thereof. Likewise, although conceptually organized as grids, pixelmaps need not actually be stored digitally in this fashion. Rather, for convenience of memory utilization and transmission, the raster pattern is usually encoded as an ordered list of pixels. Once again for clarity of presentation, the ensuing discussion will not differentiate between conceptual organization and actual storage, it being understood that any of a variety of storage formats will support the grid construct.

Figure 2:
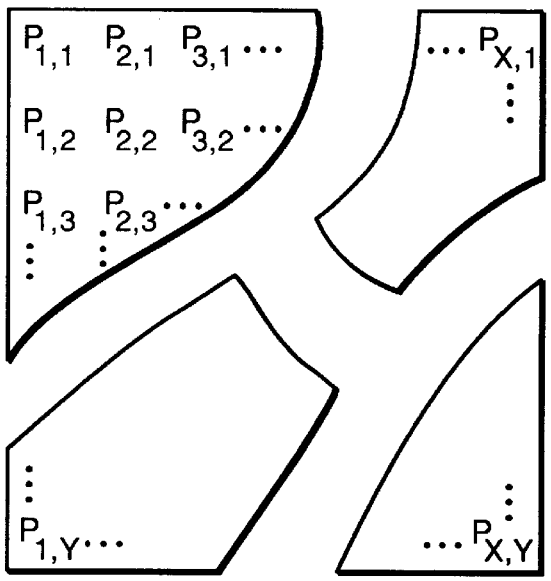
FIG. 2 illustrates the organization of a typical image pixelmap.

FIG. 2 illustrates the manner in which a pixelmap may be represented by a cartesian coordinate system, where ordered pairs of numbers specify the location of a particular pixel within the framework (of dimensions x,y) by distance from an origin point, namely, the top-left corner pixel $P_{1,1}$. Thus, the first subscript represents the rightward displacement from $P_{1,1}$ of a pixel P along the abscissa, and the second subscript indicates the downward displacement from $P_{1,1}$ along the ordinate. (The illustrated distance between pixels is for explanatory purposes only; in actual usage, pixelmap points are located sufficiently close to one another to provide a visual appearance of continuity.)

Figure 3:
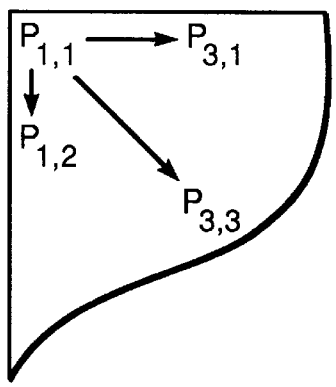
FIG. 3 shows how vector descriptions can be used to relate the positions of pixels to one another.

Once represented as components of a cartesian lattice, pixels can be related to one another by lattice vectors. For example, let x be a basis vector along the abscissa and y be a basis vector along the ordinate, where the length of each unit vector is the distance between horizontally or vertically adjacent pixels. In vector notation, then, the position of any single pixel can be specified relative to the origin by the equation $u=n_1 x + n_2 y$, where $n_1$ and $n_2$ are constants. In FIG. 3, for example, vectors are used to specify the location of three pixels relative to the origin. The vector description of pixel $P_{1,2}$ is merely u=y, since the length of the basis vector has been arbitrarily defined as the distance between adjacent pixels. The vector description of $P_{3,1}$ is u=3x, and that of $P_{3,3}$ is u=3x+3y.

Linear combinations of two non-parallel (but not necessarily perpendicular) basis vectors can be used to specify a lattice of pixels in a pixelmap. The present invention generates these linear combinations to locate points in a pixelmap where user-defined patterns are to be duplicated. With reference to FIG. 1, a user, working with at least some image data shown on display 36, uses position-sensing device 34 to define a unit image cell, which consists of a bounded set of pixels. More specifically, interface 54 permits the user to specify a bounded region of pixels to be copied; software that enables this operation is already well-known in the CAD field. In a preferred embodiment, the user defines a cell whose boundaries form a rectangle that just encloses the selected visual information. When the user is satisfied with the surrounded set of pixels (i.e., the unit cell), s/he so indicates by interaction with interface 54. In response, CPU 20, which operates according to instructions contained in main memory 22, directs image server 52 to copy the pixels of the unit cell into copy buffer 40. CPU 20 then identifies a pixel occupying a selected position (e.g., closest to the center) within the unit cell and stores its identity (e.g., its address in copy buffer 40) in a data file located in main memory 22.

Linear combinations of a vector description identify copy locations within the pixelmap where the unit cell is to be copied—or more precisely, locations where a selected point (e.g., the centermost point) of the copied unit cell is to appear. The linear vector combinations necessary to generate a complete set of copy locations are specified in the manner hereafter described.

Figure 4:
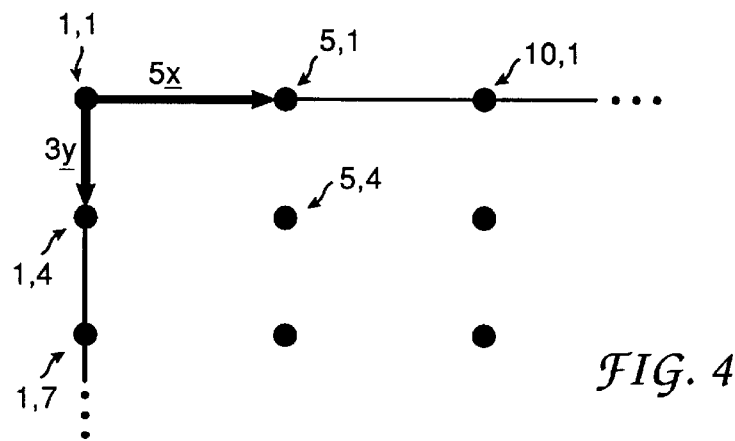
FIGS. 4 illustrate the use of placement vectors to generate desired image patterns.

As a simple example, suppose that the unit cell is a single pixel which is to be copied so as to create the rectangular lattice shown in FIG. 4, in which each closed circle represents a replicated unit cell (pixel). The copy locations are spaced apart from one another by five basis-vector lengths along the abscissa and three basis-vector lengths along the ordinate. Defining placement vectors $v_1=5x$ and $V_2=3y$ and the top-left corner of the pixelmap as the origin, the following linear combinations of $v_1$ and $v_2$ would generate the points whose locations are specified in FIG. 4:

| Location | Linear Combination |
|---|---|
| 1,1 | — |
| 5,1 | $v_1$ |
| 10,1 | $2v_1$ |
| 1,4 | $v_2$ |
| 1,7 | $2v_2$ |
| 5,4 | $v_1 + v_2$ |

The set of all integral multiples of the basis vectors $v_1$ and $v_2$ and their combinations that specify locations within the boundaries of the pixelmap represent the complete set of copy locations.

With the copy locations generated, CPU 20 next directs image server 52 to copy the contents of copy buffer 40 to each defined copy location, such that the selected point of the image specified in copy buffer 40 falls on the pixel lying closest to each copy location; in other words, because copy locations need not correspond to the locations of actual pixels, it may be necessary to identify the pixel lying closest to a copy location to center the unit cell. In the present example, because the unit cell consists of a single pixel and the copy locations correspond precisely to actual pixel locations, the unit cell is merely copied to the specified copy locations within the pixelmap.

Alternatively, in the case of simple or a limited number of cells, it may be computationally more convenient for CPU 20 to redraw the cell at each copy location according to stored rendering instructions instead of copying the contents of copy buffer 40. The circumstances favoring direct rendering over copying are straightforwardly determined by those skilled in the art.

So long as pixels are organized on a square lattice, as illustrated in FIGS. 1 and 2, the basis vectors x and y, which diverge from one another by an angle of 90°, provide a sufficient basis for convenient description. However, other lattice patterns may require placement vectors disposed at a different angle from one another.

Figure 5:
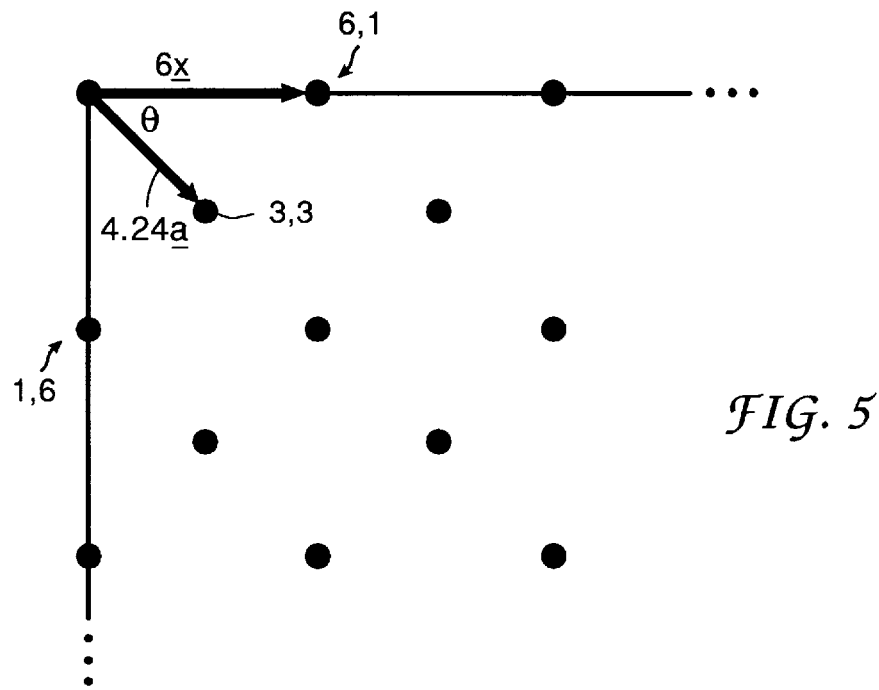

The pattern illustrated in FIG. 5, frequently employed in textile patterning and known as a "half-drop repeat," provides an example. In this case, copy locations are specified by linear combinations of a first placement vector along the abscissa ($v_1=6x$) and a second placement vector $v_2$ that diverges from the first placement vector by an angle $\Theta=45°$. The second placement vector is defined as a multiple of a basis vector a having an absolute length equal to x but diverging therefrom by 45°. To obtain the pattern shown in FIG. 5, $v_2=4.24a$. Linear combinations of the two placement vectors specify all copy locations, as shown for the points labeled in FIG. 5:

| Location | Linear Combination |
|----------|--------------------|
| 1,1      | —                  |
| 6,1      | $\underline{v}_1$  |
| 3,3      | $\underline{v}_2$  |
| 1,6      | $-\underline{v}_1 + 2\underline{v}_2$ |

In the present invention, at least one placement vector preferably runs along the horizontal or vertical axis, with the other diverging therefrom at an angle Θ equal to or less than 90°. The two placement vectors are specified such that they extend from a point defined as the origin (preferably, but not necessarily a corner point) to the two closest, non-collinear copy locations. Copy locations are then generated from the placement vectors.

The placement vectors themselves can be specified in a number of ways. In one embodiment, basis vectors corresponding to standard design patterns are stored in main memory 22. The user specifies the desired pattern and the distance between copy locations via user interface 54, prompting CPU 20 to select the basis vectors corresponding to that pattern and multiply them by the user's chosen distance parameters to define placement vectors. Alternatively, the user can utilize position-sensing device 34 to define two neighboring, non-collinear cells whose positions with respect to the origin specify the placement vectors.

Although the invention is most straightforwardly implemented by defining an origin point and copying unit cells at positions specified with respect thereto, this arrangement has no effect on what is displayed to the user. Linear combinations of the placement vectors can define an infinite lattice. The user is free to scroll the display in any direction, an action that causes CPU 20 to identify copy locations previously outside the display bounds and copy unit cells to the new locations. This flexibility permits the user to avoid a fixed placement on display 36 of the unit cell copied at the origin. Also for this reason, the point within the unit cell used to orient the cell with respect to copy locations is unimportant.

Figure 6:
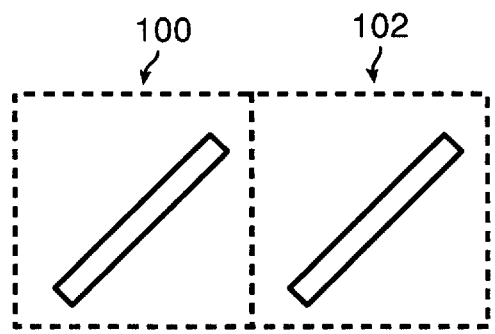
FIG. 6 shows two unit cells lying adjacent one another.

Refer now to FIG. 6, which illustrates two square unit cells 100 and 102, which are placed adjacent one another and therefore share an edge. The unit cells are six unit vectors long and six unit vectors high. Using placement vectors $v_1 = 6x$ and $v_2 = 6y$ and defining the origin as the top-left corner, the top and left edges of the left cell will appear flush with the edges of the pixelmap. The result of generating linear vector combinations is a set of copying locations that specifies adjacent repetition of the unit cells beginning at the top left corner, a design sometimes called a "brick" repeat. However, what the user actually views on display 36 can be shifted by scrolling, as described above, so the top-left corner of the screen need not correspond to the top-left corner of cell 100.

Unit cells 100 and 102 define square pixel regions that each include a diagonal image member and a background. In the practice of this invention, borders (denoted by dashed lines) surround the contents of the unit cells, and all pixels within a single cell are stored in copy buffer 40. The contents of copy buffer 40 are then used to overwrite regions of the pixelmap geometrically specified by the dimensions of the unit cell, placed according to the orientation point.

Figure 7:
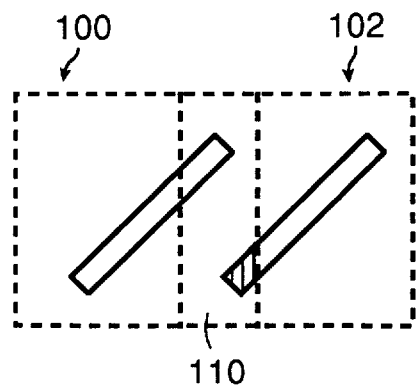
FIG. 7 depicts the effect of overlapping the image cells shown in FIG. 6.

Since the placement vectors can be of arbitrary length and orientation, the present invention is versatile enough to permit placement of unit cells so that they overlap one another as shown in FIG. 7. In such a case, it is advantageous to mask out a portion of the unit cell so it does not overwrite other pixels and, in some cases, to render the images in a particular order to prevent unwanted loss of image data due to overwriting.

In the example shown in FIG. 7, only the background—and not the diagonal image members—overlap one another in the region 110. Accordingly, one masks out from cell 102 all portions of region 110 that do not include image pixels associated with cell 102 (i.e., the shaded region of the cell 102 image member). With this portion of cell 102 masked out, copying cell 102 after cell 100 will not result in overwriting the portion of the cell 100 image member that falls within the overlap region, since the masked-out pixels are not copied.

Masking can be readily accomplished using, for example, an array of pixels corresponding to the masked region and performing pixelwise logical NAND operations between the array and the unit cell, copying only those points that survive the logic operations. If the image portions of adjacent cells overlap, one can avoid unwanted overwriting by specifying the order in which cells are copied.

It will therefore be seen that the foregoing represents a highly versatile design system that permits convenient repetitive copying of user-defined features. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A method of selectively repeating a unit image cell in a pixelmap image datafile comprising a grid of pixel locations, the method comprising the steps of:

a. defining the unit image cell by specifying a bounded region of pixels to be copied;

b. defining an origin point on the grid;

c. defining two cartesian placement vectors such that at least one placement vector is oriented vertically or horizontally and the other diverges therefrom by an angle equal to or less than 90°;

c. generating linear combinations of the placement vectors that collectively specify a set of copying locations in the pixelmap relative to the origin point; and d. sequentially copying the unit image cell into the pixelmap datafile such that a predetermined location within the copied cell coincides with pixel specified by each said linear combination of placement vectors.

2. The method of claim 1 wherein the copying locations each have a linear distance from the origin point, the placement vectors specifying, with respect to the origin point, pixelmap locations corresponding to two non-collinear copying locations having the smallest linear distances therefrom.

3. The method of claim 1 wherein a plurality of unit cells, including a first unit cell, is copied, and further comprising the step of masking out a portion of each unit cell other than the first to be copied.

4. Apparatus for designing a pixelmap-specified image containing a repeating unit image cell, the apparatus comprising:
- a. means for storing a pixelmap image datafile specifying a grid of pixel locations;
- b. a user interface;
- c. means associated with the interface for defining and storing the unit image cell by specifying a bounded region of pixels to be copied;
- c. means for defining a memory location corresponding to an origin point on the grid;
- d. processor means for:
  1) defining two Cartesian placement vectors such that at least one placement vector is oriented vertically or horizontally and the other diverges therefrom by an angle equal to or less than 90°;
  2) generating linear combinations of the placement vectors that collectively specify a set of copying locations in the pixelmap relative to the origin point; and
  3) sequentially copying the unit image cell into the pixelmap datafile such that a predetermined location within the copied cell coincides with pixel specified by each said linear combination of placement vectors.

5. The apparatus of claim 4 wherein the copying locations each have a linear distance from the origin point, the placement vectors specifying, with respect to the origin point, pixelmap locations corresponding to two non-collinear copying locations having the smallest linear distances therefrom.

6. The apparatus of claim 4 wherein the processor means copies a plurality of unit cells, including a first unit cell, and further comprising means for masking out a portion of each unit cell other than the first copied unit cell.

* * * * *